W. B. FARWELL.
Corn-Husker.
No. 224,588. Patented Feb. 17, 1880.
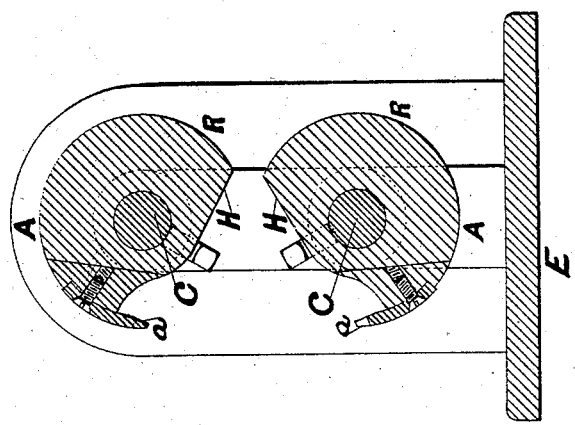
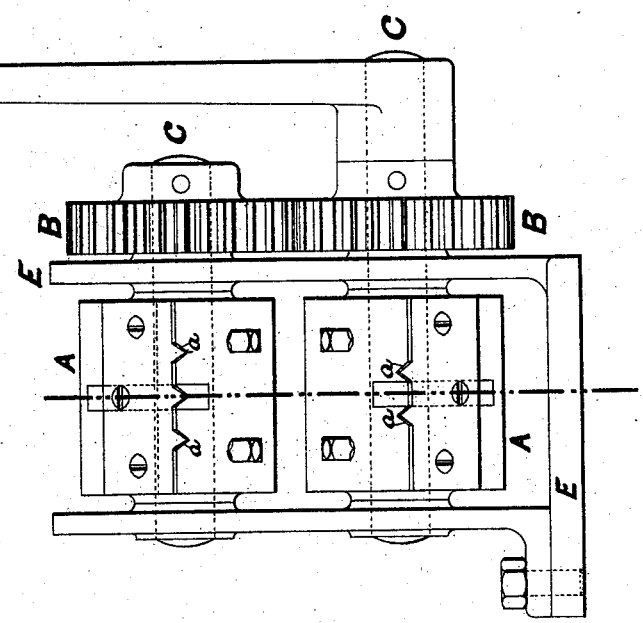
Witnesses.
Inventor.
Willard B. Farwell

UNITED STATES PATENT OFFICE.

WILLARD B. FARWELL, OF NEW YORK, N. Y., ASSIGNOR TO STEPHEN G. CLARKE, OF TENAFLY, N. J.

CORN-HUSKER.

SPECIFICATION forming part of Letters Patent No. 224,588, dated February 17, 1880.

Application filed January 2, 1879.

*To all whom it may concern:*

Be it known that I, WILLARD B. FARWELL, of the city and county of New York, in the State of New York, have invented a new and useful Improvement in Corn-Huskers, of which the following is a specification.

My invention relates to that class of implements or machines which are designed for removing the husks from ears of Indian corn or maize in a more expeditious and economical manner than it can be done by hand.

My invention consists in combining two cams or rollers, flattened upon one side and provided with blunt teeth, in such a manner that they shall grasp an ear of corn at each revolution and break or bite off the stalk connecting the ear with the husks at the butt of the ear and carry the husks with it away from the ear. I place the cams or rollers one over the other, and hang them upon shafts connected at one end by gearing and set it in a suitable frame. The power is applied by means of a crank attached to the lower shaft. The cams or rollers are made in the shape of a D, and are so arranged that the roller-surfaces shall come together and the flat surfaces come opposite each other during each revolution. At the point where the roller-surfaces first meet each other in the course of a revolution blunt teeth are constructed, which are carried out in the direction the roller-surface would occupy if the roller were not flattened.

The operation of the machine is as follows: The operator turns the crank until the flattened surfaces of the rollers come opposite each other, and thrusts the butt of an unhusked ear of corn into the opening between the rollers as far as it will go, and continues to turn the crank. The teeth come around and bite off the cob or stalk close up to the butt of the ear, and the roller-surfaces grasp the husks and carry them through, while the ear drops down on the same side of the machine where it was introduced.

In the accompanying drawings, which are designed to form a part of this specification, Figure 1 is a front view of my machine, and Fig. 2 is a sectional view.

Like letters of reference refer to like parts in both figures.

A A are the rollers or cams. B B are the gear-wheels, and C C the shafts upon which they are hung. F is the crank, and E E the frame, of the machine.

The flattened surfaces are seen at H H in Fig. 2, and the roller-surfaces at R R. *a a* are blunt teeth projecting from the roller-surfaces.

In practice I have found it best to hang the rollers far enough apart to leave a space of about half an inch between the roller-surfaces to prevent clogging, and to make the rollers about three inches in diameter; but it is not necessary to preserve these dimensions exactly.

It is obvious that these rollers or cams may be made of any convenient length, and may be combined in any number of pairs and run by power, if desired.

I am aware that the use of rollers for husking corn is not new, as they have hitherto been used in a great variety of forms for that purpose; but in all the machines I have known the husking-rollers have been designed to grasp the free end of the husk and pull it off sidewise, while my machine operates upon an entirely different principle.

I am also aware that corrugated rollers and cams of different shapes have been used in husking-machines to break the ear from the stalk without husking it, and prepare it for husking-rollers operating in the usual way; but none of these devices have been provided with the blunt teeth hereinbefore set forth, or their equivalent, and none of them have been designed to perform the whole operation of husking, nor have they been capable of doing it.

I do not claim to have invented any of these things; but,

Having described my invention, what I claim as new is—

A corn-husking machine consisting of a pair of rollers or cams geared together, and constructed in the form of cylinders cut away or flattened for about half their circumferences, and furnished with teeth arranged along the edges of said flattened surfaces and extending over the same in the direction of the circumferences of the cylinders, the said rollers being so arranged that their teeth meet together upon each revolution, substantially as described, and for the purposes set forth.

WILLARD B. FARWELL.

In presence of—
   CHAS. C. CLAGGETT,
   MELVIN BROWN.